United States Patent [19]

Shiverdecker

[11] 4,232,469
[45] Nov. 11, 1980

[54] FISH LURE

[76] Inventor: Howard P. Shiverdecker, Park City South, Lot 132, Bloomfield, Ill. 61701

[21] Appl. No.: 25,798

[22] Filed: Apr. 2, 1979

Related U.S. Application Data

[63] Continuation-in-part of Ser. No. 855,898, Nov. 30, 1977, abandoned.

[51] Int. Cl.³ ............................................. A01K 85/00
[52] U.S. Cl. ................... 43/42.27; 43/42.35; 43/42.48
[58] Field of Search ............... 43/2, 3, 42.09, 42.22, 43/42.24, 42.25, 42.27, 42.35, 42.36, 42.45, 42.48; 46/91, 92, 124; D22/27, 28

[56] References Cited

U.S. PATENT DOCUMENTS

| | | | |
|---|---|---|---|
| 235,845 | 12/1880 | Appleton | 43/3 |
| 278,461 | 5/1883 | Screven | 43/2 X |
| 1,562,625 | 11/1925 | Fife | 43/3 X |
| 1,599,763 | 9/1926 | Head | 43/42.09 |
| 1,611,117 | 12/1926 | Kearns | 43/42.09 |
| 1,999,522 | 4/1935 | Van Houten | 43/42.48 X |
| 2,495,021 | 1/1950 | Pruden | 43/42.35 X |
| 2,517,962 | 8/1950 | Bastre | 43/42.45 X |
| 2,579,377 | 12/1951 | Flynn | 43/42.09 |
| 2,692,451 | 10/1954 | Deuster | 43/3 X |
| 2,847,791 | 8/1958 | Simmons | 43/42.36 X |
| 3,436,856 | 4/1969 | Miller | 43/3 |

*Primary Examiner*—Nicholas P. Godici
*Assistant Examiner*—Robert P. Olszewski
*Attorney, Agent, or Firm*—Thomas L. Kautz; Gerald T. Shekleton

[57] ABSTRACT

A fishing lure is provided, which is particularly adapted for fresh water game fish such as bass, including a plug having flexible wings, tail feathers and feet formed to resemble those of a bird for simulating the flapping and fluttering motion of a non-aquatic bird which has fallen into the water.

1 Claim, 9 Drawing Figures

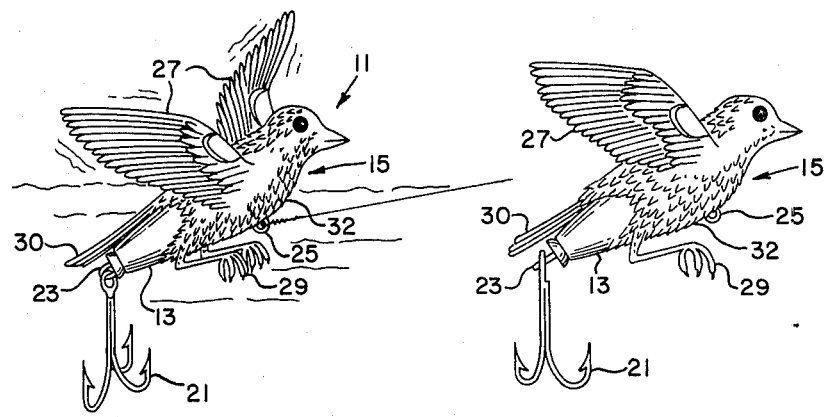
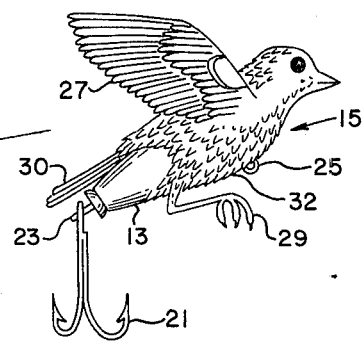
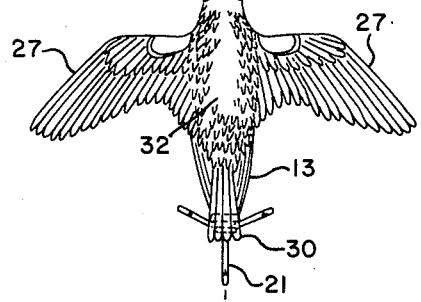
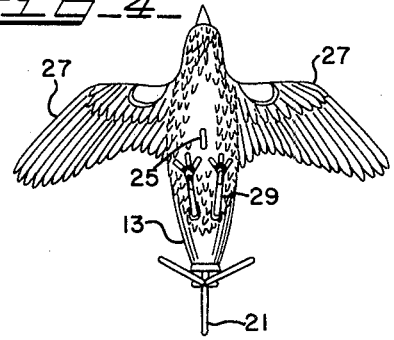
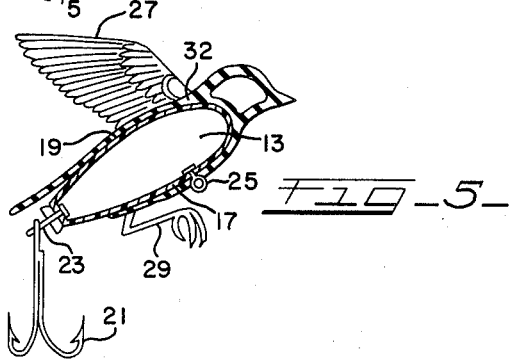

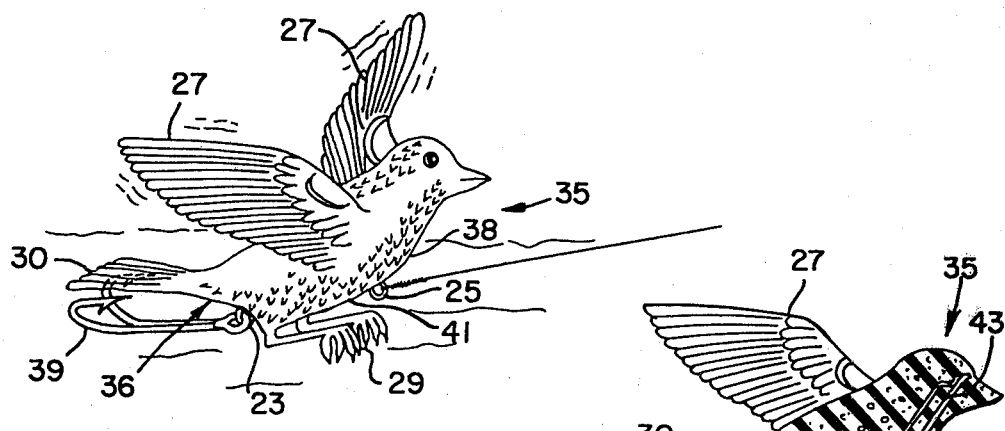
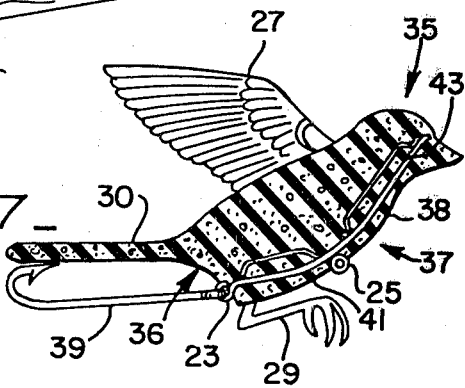
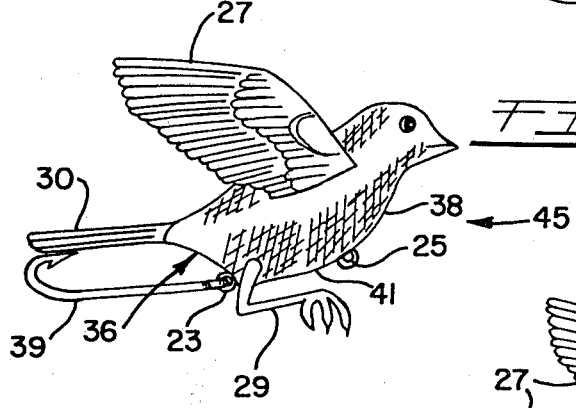
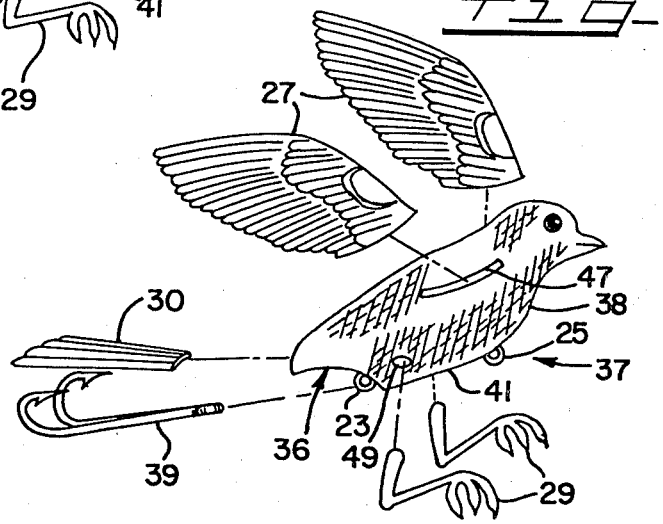

FISH LURE

The present application is a continuation-in-part of my earlier filed application, Ser. No. 855,898, filed Nov. 30, 1977, now abandoned.

BACKGROUND OF THE INVENTION

The present invention relates generally to artificial bait used in fishing and casting, and, more specifically, to a fishing lure which is particularly designed for catching bass and other types of fresh water game fish.

Many fishing lures have been developed to simulate the activity of an insect or small animal which has accidentally fallen into the water. As disclosed in U.S. Pat. Nos. 1,874,102 and 2,567,787, such lures may be provided with means for moving the lure in a particular manner, in response to quick jerks or tugs on the fishing line as the lure is retrieved. Experience has generally shown that such lures inadequately simulate the actual appearance and movement of the insect or animal. In many instances, this is caused by locating the line-receiving eyelet on the lure in a position close to the head or front portion of the lure. When such lures are retrieved with a series of quick jerks, they tend to dip into the water rather than riding on the surface to attract the attention of fish.

It has also been found that the physical appearance of a lure is as important as the manner in which it moves in the water. Many prior art floating lures do not closely duplicate the appearance of the insect or animal from which they are copied, in terms of physical size, shape or color. For a lure to be consistently successful in attracting game fish such as bass, it must closely simulate the physical appearance of the food source from which it is copied, as well as the movement of such food source.

SUMMARY OF THE INVENTION

Accordingly, the present invention provides a fishing lure which very closely simulates the appearance and activity of a food source of bass and other game fish. Many varieties of non-aquatic birds, such as redwing blackbirds, often nest in close proximity to water, and it is not unusual for a young bird to accidentally fall into a nearby stream, pond or lake. It has been observed that bass and other game fish will often strike such birds as they are struggling to escape from the surface of the water.

The fishing lure herein may be formed in a variety of ways as described in the alternate embodiments discussed below. Generally, flexible wings, feet and tail feathers are attached to a bouyant plug section which is formed to automatically orient itself in the water at a slight angle with the surface, so that the wings are disposed on the surface of the water and the feet and tail feathers are submerged. As discussed below, the structure of the plug and orientation of the flexible appendages of the bird shape enable the lure of the present invention to effectively simulate the struggling movement in the water of a non-aquatic bird such as a redwing blackbird.

The type of movement simulated by the present invention is in contrast to that disclosed in U.S. Pat. Nos. 2,517,962 to Bastie and 2,692,451 to Deuster. These patents teach structure which simulates the appearance and swimming movement in the water of aquatic birds such as geese or ducks. It is apparent that the swimming motion of an aquatic bird is much different from the struggling motions of a non-aquatic bird attempting to escape from the water's surface.

Although the body of the lure in the embodiments shown herein is patterned after a redwing blackbird, it is contemplated that the lure may be formed to resemble any other type of bird which may accidentally fall into the water. The lure of the present invention has proved to be most attractive to fresh water game fish, particularly bass, and is far superior to prior art lures which depend entirely on line movement for their motion or "action" in the water.

It is therefore an object of the present invention to provide a bouyant lure which very closely simulates the movement and appearance of a non-aquatic bird in the water.

It is another object of the present invention to provide a fishing lure resembling a bird, which simulates the flapping and struggling motion of the wings, legs and tail feathers of a live bird in the water.

It is a further object of the present invention to provide a fishing lure including a plug portion formed to automatically orient itself right-side-up when cast into the water, at a slight angle to the water's surface.

It is still another object of the present invention to provide a lure having a line-receiving eyelet positioned on the plug portion of the lure such that it remains on the surface of the water when retrieved or reeled in.

BRIEF DESCRIPTION OF THE DRAWINGS

Objects in addition to the foregoing will become apparent upon consideration of the following description taken in conjunction with the Figures herein:

FIG. 1 is a perspective view of one embodiment of the fishing lure of the present invention as it appears in the water, having a body section resembling a bird attached to a plug portion;

FIG. 2 is a side evaluational view of the embodiment of FIG. 1;

FIG. 3 is a plan view of the FIG. 1 embodiment;

FIG. 4 is a view of the underside of the present invention as shown in FIG. 1;

FIG. 5 is a cross-sectional view taken generally along line 5—5 of FIG. 2 showing the plug and the attachment of the hook and line-receiving eyelet thereto;

FIG. 6 is an alternate embodiment of the present invention;

FIG. 7 is a cross-sectional view of the embodiment of FIG. 6 showing the hook and eyelet attachment;

FIG. 8 is another embodiment of the present invention; and,

FIG. 9 is a fragmented view of the embodiment shown in FIG. 8.

DETAILED DESCRIPTION OF THE INVENTION

Referring now to the embodiment shown in FIGS. 1-5, the fishing lure of the present invention is labeled generally as 11. The lure 11 includes a plug 13 over which is secured a body 15 formed to resemble a small bird. The plug 13 may be made of plastic having a hollow interior, as shown in FIG. 5, or of solid wood, so long as the lure 11 is bouyant and floats in the water. The plug 13 is formed with a generally flat bottom portion 17, and a slightly rounded or arched top portion 19. (See FIG. 5)

A three-barbed hook 21 is attached rearwardly on plug 13 to an eyelet 23. It has been found that the configuration of the plug 13 and the weight of hook 21 at its rearward end, causes plug 13 to float upright on its bottom portion 17 and to automatically orient itself at a slight angle to the surface of the water. This is significant because, as discussed below, the action or movement of the lure 11 depends on the particular orientation of plug 13 in the water.

The plug 13 is covered with a body 15 which is made to resemble a redwinged blackbird in the embodiment of FIG. 1, although many other types of birds could act as a model for the body 15 and be used with the plug 13. The body 15 consists of a pair of wings 27 and feet 29 cantilevered outwardly from a hollow trunk 32, and which are movable relative thereto. The body 15 also includes simulated tail feathers 30 which extend beyond the end of plug 13. The body 15 is molded in one piece from a flexible resilient material such as rubber or any suitable equivalent to allow free movement of the wings 27, feet 29 and tail feathers 30 in the water. The hollow trunk 32 of body 15 is inserted over plug 13 and attached thereto by water resistent glue or other suitable means. A slit is made in trunk 32 approximately midway along the bottom portion 17 of plug 13, to receive a line-receiving eyelet 25 which aids in securing the body 15 to plug 13.

Referring now to FIGS. 6 and 7, another embodiment of the present invention is shown. In this embodiment, the lure 11 is formed as a one-piece unit 35 with the wings 27, feet 29 and tail feathers 30 being integrally attached. This may be accomplished using a poured casting of flexible rubber or a suitable synthetic equivalent, or any other acceptable method of one-piece fabrication. As shown in FIG. 6, a recessed portion 36 is formed at the rear of lure 11, in which a weedless hook 39 is mounted to eyelet 23. The bottom section 37 of unit 35 includes a curved portion 38 which extends approximately mid-way therealong to eyelet 25, and a substantially flat portion 41 extends from the eyelet 25 adjacent to recessed portion 36.

It has been found that the structure of bottom section 37 and recessed portion 36 causes lure 11 to automatically orient itself in the water at a slight angle to the surface. The weight of hook 39, disposed along recessed portion 36, tends to pull the lure 11 downwardly so that the flat portion 41 of bottom section 37 rests on or slightly beneath the surface of the water and the curved portion 38 extends at least partially out of the water. As lure 11 is retrieved or reeled in, weedless hook 39 assumes the position shown in FIG. 6, but the angle of the lure 11 relative to the surface of the water is maintained due to the position of eyelet 25 near the center of bottom section 37, as discussed below.

The eyelet 25 to which the line is attached, and eyelet 23 which receives hook 39, are mounted to an arcuate support strip 43 made of relatively rigid wire or an equivalent (See FIG. 7). Strip 43 is disposed within the lure 11 for the dual purpose of providing a means of attaching eyelets 23 and 25 to the lure 11, and also to give support and strength to the lure 11 which, as mentioned above, is made of a flexible rubber or a synthetic equivalent. It has been found that providing a support strip 43 eliminates problems of ripping or tearing of lure 11 at the point where eyelet 23 and 25 are attached, which can occur while reeling in a fish.

Referring now to FIGS. 8 and 9, a third embodiment of the present invention is shown. The structure of this embodiment is essentially the same as that of FIGS. 6 and 7, except that the body portion 45 herein is made of hollow plastic or a suitable equivalent. The wings 27 are made separately and inserted into slots 47 formed on each side of body 45 and secured thereto by a water resistent glue. Feet 29 are attached to the body 45 in openings 49 formed adjacent the flat portion 41 of bottom section 37. The tail feathers are also glued to the body 45, adjacent recessed portion 36. Eyelets 23 and 25 are attached directly to body 45, in the same position as in the embodiment of FIGS. 6 and 7.

A problem associated with many existing floating lures is that the eyelet attaching to the line is placed near the front portion of the lure. Experience has shown that such positioning of the line-receiving eyelet may cause the lure to dip downwardly into the water rather than remain on the surface as it is reeled in. This is particularly troublesome where the movement of prior art floating lures is dependent on retrieving them with a series of quick jerks or tugs on the line, as it has been found that such lures may alternately submerge and return to the surface of the water in response to the tugs on the line, which may tend to frighten game fish instead of attracting them.

In each of the embodiments of the present invention discussed above, the line-receiving eyelet 25 is uniquely positioned approximately mid-way along the bottom portion of the lure 11, which causes the lure 11 to move through the water as it is retrieved, at approximately the same angle relative to the surface of the water as in the at-rest floating position before it is reeled in. Such positioning of the line-receiving eyelet 25 assures that the lure 11 will always remain at a slight angle on the surface, and, in particular, enables the wings 27 to remain above water so that they can simulate the movement of a non-aquatic bird in the water as explained below. Even if the line is jerked somewhat as the lure 11 is retrieved, which many fishermen could be expected to do based on their use of other lures intended for bass fishing, the lure 11 will remain on the surface of the water to attract fish.

For a fishing lure to be consistently effective in attracting fish, it must closely simulate the appearance and movement of a normal food source for the fish. An important feature of the present invention is that the movement and appearance of lure 11 closely simulate the struggling motion of a live, non-aquatic bird which accidentally landed in the water.

As shown in the Figures, the lure 11 floats in the water at a slight, upward angle to the surface so that it is partially submerged to a point where at least a portion of the wings 27 rest on the surface of the water, and the feet 29 and tail feathers 30 of the lure 11 are completely submerged. As noted above, when the lure 11 is retrieved or reeled in, it moves in the water at the same slight upward angle, relative to the surface of the water, with the head portion of the body 15 being somewhat higher than the tail portion. Such movement causes the resilient rubber-like wings 27, cantilevered outwardly from the lure 11, to gently tap the surface of the water in a flapping or fluttering movement which closely resembles the flapping of the wings of a small, non-aquatic bird that has fallen into the water. The wings 27 not only simulate the movement of a live bird, but stirs the water up around the lure 11 to attract the attention of fish. The feet 29 and tail feathers 30 beneath the surface of the water, and cantilevered outwardly from lure 11, move independently and add to the life-like movement of the lure 11.

As mentioned above, in many prior art lures intended primarily for bass fishing, including so-called "poppers" and "bugs", the action or movement of the lure is dependent upon retrieving it with a series of short tugs or jerks on the line as disclosed, for example, in U.S. Pat. No. 1,874,102 to Jacobs mentioned above. An additional unique advantage of the present invention is that the intermittent flapping or fluttering movement of the flexible wings 27 may occur without retrieving or reeling in the lure 11. For example, where there is a slight breeze or other movement causing ripples in the water, the wings 27 floating on the surface of the water will begin to flap or flutter with the motion of the waves or ripples. Thus, if the fisherman has made a cast into an area of a pond or stream which he feels looks particularly promising for fish, he may let the lure 11 of the present invention ride on the waves without reeling in, or allow the lure 11 to drift, and still achieve the desired action or movement of his lure in that particular spot. This feature of the present invention is especially helpful for youngsters or people just learning to cast, as it enables such persons to make their casts a little less accurately and then allow the lure 11 to drift to the desired area, without losing the effective movement of the lure.

Upon a consideration of the foregoing, it will become obvious to those skilled in the art that various modifications may be made without departing from the invention embodied herein. Therefore, only such limitations should be imposed as are indicated by the spirit and scope of the appended claims.

I claim:
1. An artificial bait for use in fishing comprising a bouyant plug and a body, said body being secured to said plug to simulate the appearance and movement of a non-aquatic bird in the water, said body including an upper body portion having wings formed of a resilient flexible material cantilevered outwardly therefrom, and a lower body portion having feet and tail feathers formed of said resilient flexible material cantilevered outwardly therefrom, said plug having a bottom plug surface having a generally flat section for floating in the water, and a recessed plug section at its rearward end, a hook being attached to said recessed plug section to orient said plug at a slight angle relative to the surface of the water to submerge at least a part of said lower body portion including said feet and tail feathers, and to place said upper body portion including said wings at least partially above the water's surface, a line-receiving eyelet attaching to said bottom plug surface approximately mid-way therealong adjacent said flat section for retrieving said artificial bait through said water at said slight angle relative to the water's surface, whereby said resilient feet and tail feathers flex and move beneath the surface of the water with the movement of said artificial bait while floating or being retrieved through the water, and said flexible wings disposed on the water's surface intermittently contacting the surface in a fluttering and flapping motion in response to movement of said artificial bait while floating or being retrieved through the water to simulate the movement and appearance of a non-aquatic bird in the water.

* * * * *